United States Patent
Furukawa et al.

(10) Patent No.: US 6,970,613 B2
(45) Date of Patent: Nov. 29, 2005

(54) OPTICAL RECEIVER AND OPTICAL TRANSMISSION APPARATUS

(75) Inventors: Hiroyuki Furukawa, Yokohama (JP); Tomoyuki Otsuka, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/829,367

(22) Filed: Apr. 22, 2004

(65) Prior Publication Data

US 2005/0157976 A1 Jul. 21, 2005

(30) Foreign Application Priority Data

Jan. 21, 2004 (JP) .............................. 2004-012727

(51) Int. Cl.[7] .............................. G02B 6/26; H04J 14/02
(52) U.S. Cl. .............................. 385/15; 385/14; 385/24; 385/34; 385/88; 385/92; 398/79; 398/82; 398/85
(58) Field of Search .............................. 385/15, 24, 31, 385/37, 42, 88, 89, 92, 14; 398/68, 69, 79, 398/82, 85

(56) References Cited

U.S. PATENT DOCUMENTS

| | | | |
|---|---|---|---|
| 5,448,390 A | * | 9/1995 | Tsuchiya et al. .............. 398/42 |
| 5,552,919 A | * | 9/1996 | Majima et al. ............. 398/213 |
| 5,696,859 A | | 12/1997 | Onaka et al. ................. 385/24 |
| 6,359,726 B1 | * | 3/2002 | Onaka et al. ............. 359/337.1 |
| 2002/0061162 A1 | * | 5/2002 | Okayama ..................... 385/24 |
| 2003/0179988 A1 | * | 9/2003 | Kai et al. ..................... 385/24 |
| 2003/0193714 A1 | * | 10/2003 | Kosaka et al. ......... 359/341.41 |

FOREIGN PATENT DOCUMENTS

| | | | |
|---|---|---|---|
| JP | 8-237203 | 9/1996 | ............... 385/24 X |
| JP | 11-122221 | 4/1999 | ............... 385/24 X |

* cited by examiner

Primary Examiner—Brian M. Healy
(74) Attorney, Agent, or Firm—Staas & Halsey LLP

(57) ABSTRACT

The optical receiver includes: an optical input port for receiving WDM signals; a transmittable-wavelength-variable filtering unit which transmits, of the received WDM signals, a light signal in a predetermined transmittable wavelength bandwidth with a desired central wavelength of $\lambda i$ (i=1 to n: n is an integer number greater than 2); an optical output port which outputs the remaining light signals at wavelengths ($\lambda i$) (k=1 to n; k≠i) untransmittable through the transmittable-wavelength-variable filtering unit; and a control unit which controls the central wavelength so that the level of the light signal passing through the transmittable-wavelength-variable filtering unit is the maximum. It is whereby possible to flexibly accommodate changes in number of channels combined in a WDM system, and to adaptively minimize ASE light leaking into the photoreceptor of the optical receiver even in a CWDM system with wide channel spacing.

13 Claims, 14 Drawing Sheets

OPTICAL RECEIVER AND OPTICAL TRANSMISSION APPARATUS

BACKGROUND OF THE INVENTION (1) Field of the Invention

The present invention relates to an optical receiver and an optical transmission apparatus. The invention particularly relates to an optical receiver and an optical transmission apparatus suitable for use in a wavelength division multiplexing (WDM) optical transmission system.

(2) Description of the Related Art

FIG. 16 depicts a previous WDM transmission system. As shown in FIG. 16, light signals output from more than one optical sender 100 are multiplexed by a multiplexer 200 and then amplified by an optical amplifier 300 before being sent out to a transmission path 400. On the receiver end, the incoming WDM signals are amplified by an optical amplifier 500 and split (demultiplexed) by a demultiplexer 600 among separate optical receivers 700 for each wavelength.

Here, the following patent document 1 shows an example in FIG. 16 where an optical filter array serves as the aforementioned optical demultiplexer 600. Document 1 proposes a method for controlling wavelengths in an optical transmission system and also an optical receive system following the wavelength control method. According to the method, an optical tree coupler or the like branches (splits) WDM signals ($\lambda 1$ to $\lambda n$, and $\lambda abs$) into n+1 light signals, and then, a filter array having as many inputs and outputs as the number of the multiplexed wavelengths plus 1 transmits all the required wavelengths, thereby rendering unnecessary wavelengths attenuated. This filter array is controlled as follows: a pilot light signal, prepared as an exclusive wavelength of $\lambda abs$, is detected by an photoreceptor device independently prepared, and on the basis of the detected pilot signal, a control circuit drives a Peltier device provided for the filter array, thereby controlling the filter array in a collective way.

The following patent document 2 proposes an art (wavelength selector) for use on the receiver end. This technique uses a single optical tunable filter (OTF) to selectively receive a light signal at a desired wavelength, out of the incoming WDM signals. More precisely, on the sender end, ID signals having different frequencies are superimposed, one on each of the light signals transmitted on separate optical channels; on the receiver end, the OTF transmits a light signal at a desired wavelength, and the filter characteristic of the OTF is controlled in such a manner that the amplitude of the ID signal superimposed on the transmitted light signal becomes the maximum. It is whereby possible to select a light signal at a desired wavelength with crosstalk being minimized, even if channel spacing or optical power levels of the WDM signals are varied.

[Patent document 1]
Japanese Patent Application Laid Open No. HEI 08-237203

[Patent document 2]
Japanese Patent Application Laid Open No. HEI 11-122221

The previous techniques have the following problems. In the techniques shown in FIG. 16 and patent document 1, there is need for preparing multiplexers and demultiplexers equal in number to signals multiplexed in the WDM system, or an optical tree coupler or an optical filter array having as many ports as the number of the signals multiplexed in the WDM system. For instance, let us consider a case where a minimum number of optical senders and optical receivers are prepared for a small number of channels due to low network load (at the time of initial installation, for example). In this case, in anticipation of future demands (increase in number of channels), the previous construction needs to prepare a greater number of multiplexers and demultiplexer than is actually required at the initial installation of the system, or an optical tree coupler and an optical filter array with a greater number of ports than is necessary at the time of installation.

Further, when an optical tree coupler is used as disclosed in patent document 1, the greater the number of resultant signals the WDM signals are split into, the greater become losses being caused, so that the intensity (level) of light signals entering the optical receivers is lowered. Furthermore, for the purpose of collectively controlling the optical filter array, it is required to prepare a dedicated pilot light sender and a dedicated receiver for monitoring the pilot light, and at least one of the channels in the band is whereby occupied so that a total transmission amount is resultantly reduced.

In WDM systems, it is required that a maximum number of optical channels (commonly, 16 or more) are packed in a limited wavelength bandwidth as densely as possible (spacing between adjacent channels should be about 0.4 nm to 1.6 nm), and recently, DWDM (Dense WDM) systems have increasingly been introduced in backbone networks on a commercial basis. Such DWDM systems raise the necessity of wavelength control such that light signals are kept within a required band. The wavelength control function has a drawback that temperature of a light-emitting device and an operation current must be accurately controlled, thereby increasing manufacturing cost.

Therefore, a reasonable CWDM (Coarse WDM) system has recently been developed which requires no such accurate wavelength control. In the CWDM system, standardization of a relatively wide channel spacing of about 20 nm has recently been promoted so that, even if wavelength variations are caused due to manufacture variations of light-emitting devices, or variations in temperature or driving current, crosstalk into an adjacent channel will be able to be minimized, thereby preventing receive sensitivity being deteriorated.

Generally speaking, in WDM transmission systems, optical amplifiers are disposed on the sender end, at relay points, and on the receiver end, or alternatively, one optical amplifier can be arranged at the most appropriate position alone of these, so as to increase transmission distance. Such an optical amplifier is realized by a rare-earth doped optical fiber, a distributed Raman amplifier, a concentrated Raman amplifier, a semiconductor amplifier, or the like, and all of these generate amplified spontaneous emission (ASE) light. The ASE light, if entering a receiver, acts as noise, and the receive sensitivity of the receiver is whereby deteriorated, so that the effect of increasing transmission distance caused by the optical amplifiers is obstructed.

In the above CWDM system, in particular, wavelength variations are caused due to manufacture variations of light-emitting devices on the sender end and variations in temperature or driving current. Thus, even if such manufacture variations are successfully minimized, temperature-dependent variations in wavelength will still appear. Taking this into consideration, the wavelength bandwidth of each signal passing through the demultiplexer is set as wide as 13 nm to 14 nm. In this case, if an optical amplifier is placed before the demultiplexer, it will cause a great amount of ASE light to enter an optical receiver disposed after the demultiplexer. As a result, the optical amplification effect will be suppressed, or the transmission distance can even be reduced, far from being lengthened, if worsened by where to place the optical amplifier.

Further, according to the art (wavelength selector) disclosed in patent document 2, it is possible to selectively receive a signal at a desired wavelength with crosstalk being minimized, even when channel spacing or optical power levels of the WDM signals are not constant. However, if the wavelength selector is applied to the CWDM system and its transmittable wavelength bandwidth is set as wide as 13 nm to 14 nm as described above, a great amount of ASE light will likewise enter the receiver.

Further, since only a single wavelength can be received at a time in the above art, the transmittable wavelength of the OTF needs to be switched into a time-division system, or wavelength selectors identical in construction need to be prepared, one for each channel multiplexed in the WDM signals. In the former, since the switching rate depends on response characteristics of the OTF, some channels are expected to become unavailable, in high-speed optical transmission systems, according to the switching rate. On the other hand, the latter has a disadvantage of great increase in system size and cost.

SUMMARY OF THE INVENTION

With the foregoing problems in view, it is an object of the present invention to provide an optical receiver and an optical transmission apparatus at reasonable costs, which flexibly accommodates increase in number of channels combined in a WDM system, and adaptively minimizes ASE noise even in a CWDM system with wide channel spacing.

In order to accomplish the above object, according to the present invention, there is provided an optical receiver, comprising: an optical input port which receives incoming wavelength-division multiplexed (WDM) light signals; a transmittable-wavelength-variable filtering means which allows or permits, of the WDM light signals input from the optical input port, a light signal in a predetermined transmittable wavelength bandwidth to pass therethrough, a central wavelength of which transmittable wavelength bandwidth being a desired wavelength; an optical output port which outputs, of the WDM light signals input from the optical input port, the remaining light signals at wavelengths which do not pass through the transmittable-wavelength-variable filtering means; and a control means which controls the central wavelength of the transmittable-wavelength-variable filtering means in such a manner that the level of the light signal passing through the transmittable-wavelength-variable filtering means is the maximum.

As a preferred feature, the transmittable wavelength bandwidth which passes through the transmittable-wavelength-variable filtering means is set narrower than channel spacing of the WDM signals.

As another preferred feature, the transmittable-wavelength-variable filtering means has a reflective member for reflecting the remaining light signals at wavelengths which do not pass through the transmittable-wavelength-variable filtering means to the optical output port.

As a generic feature, the optical transmission apparatus comprises N optical receivers, N being an integer number greater than 2, and the optical output port of the ith (i=1 to N−1) optical receiver is connected to the optical input port of the (i+1)th optical receiver.

As a preferred feature, an optical amplifier for amplifying incoming WDM signals is connected to the first optical receiver.

As another preferred feature, at least one optical amplifier is interposed between two or more of the optical receivers.

As another generic feature, there is provided an optical receiver for receiving a light signal at an individual wavelength, which is obtained by optically amplifying incoming wavelength-division multiplexed (WDM) signals and then demultiplexing the WDM signals into individual wavelengths. The optical receiver comprises: a transmittable-wavelength-variable filtering means which allows or permits a light signal in a given transmittable wavelength bandwidth to pass therethrough, which given transmittable wavelength bandwidth being narrower than channel spacing of the WDM signals; and a control means which controls a central wavelength of the transmittable-wavelength-variable filtering means in such a manner that the level of the light signal passing through the transmittable-wavelength-variable filtering means is the maximum.

As still another generic feature, there is provided an optical transmission apparatus, comprising: an optical amplifier for amplifying wavelength-division multiplexed (WDM) signals; an optical demultiplexer for demultiplexing the WDM signals received from the optical amplifier into light signals at separate wavelengths; and an optical receiver for receiving an individual one of the separate wavelengths. The optical receiver includes: a transmittable-wavelength-variable filtering means which allows or permits a light signal in a given transmittable wavelength bandwidth to pass therethrough, which given transmittable wavelength bandwidth being narrower than wavelength spacing of the WDM signals; and a control means which controls a central wavelength of the transmittable-wavelength-variable filtering means in such a manner that the level of the light signal passing through the transmittable-wavelength-variable filtering means is the maximum.

The optical receiver and the optical transmission apparatus of the present invention guarantee the following advantageous results.

At initial installation of a WDM system, it is possible to eliminate the necessity of preparing an expensive optical demultiplexer with a greater number of ports than is actually necessary, and it is also possible to add a required number of optical receivers later as the needs arises, thereby flexibly accommodating increase (or decrease) in number of channels combined in WDM signals, so that the cost of initial installation of the WDM transmission apparatus and the WDM transmission system can be greatly reduced. Further, it is also possible to give the apparatus and the system the flexibility to change channel spacing of WDM signals on the sender end even after installation of the system.

In addition, since the transmittable-wavelength-variable filtering means transmits a wavelength bandwidth narrower than channel spacing of the WDM signals, the central wavelength of the light passing through the transmittable-wavelength-variable filtering means is made approximate to an optical transmission channel by the control means, so that noise light, such as ASE light or the like, is efficiently prohibited entering the optical receivers, thereby improving receive sensitivity.

Other objects and further features of the present invention will be apparent from the following detailed description when read in conjunction with the accompanying drawings.

DESCRIPTION OF THE PREFERRED EMBODIMENT(S)

Figure 1:
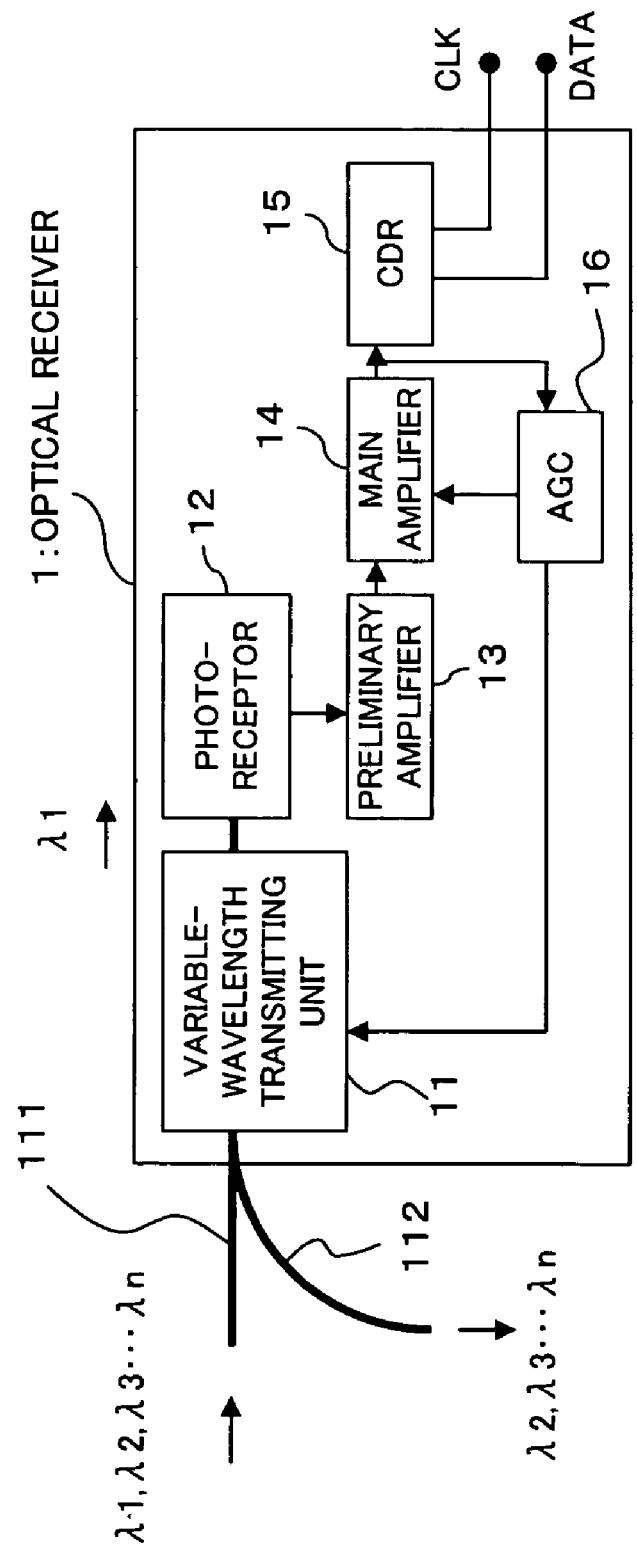
FIG. 1 is a block diagram schematically showing a construction of essential part of an optical receiver according to a first preferred embodiment of the present invention.

[A] Description of the Optical Receiver:

FIG. 1 shows a construction of essential part of an optical receiver according to a first preferred embodiment of the present invention. The optical receiver 1 includes a variable-wavelength transmitting unit (transmittable-wavelength-variable filtering means) 11, a photoreceptor 12, a preliminary amplifier 13, a main amplifier 14, a clock data recovery (CDR) circuit 15, and an AGC (Automatic Gain Control) circuit 16.

Here, the variable-wavelength transmitting unit 11 has an optical input terminal (port) 111 and an optical output terminal (port) 112. The optical input port 111 receives incoming wavelength-division multiplexed light (WDM signals), in which light at wavelengths, for example, of λ1 through λn (n is an integer number greater than 2) are wavelength-division multiplexed, and the optical output terminal (port) 112 outputs the remaining untransmittable light at wavelengths other than that which is to be transmitted to the following photoreceptor 12 (that is, to be received by the optical receiver 1). The variable-wavelength transmitting unit 11 transmits, of the received WDM signals input from the optical input terminal 111, a light signal in a predetermined transmittable wavelength bandwidth (will be detailed later) whose central wavelength is a desired wavelength of λj (j=1 to n), to the photoreceptor 12, and outputs other wavelengths of λj (k≠j) to the optical output terminal 112. In this example, the AGC circuit 16 (will be detailed later) performs controlling so that the central wavelength (transmittable central wavelength) is corrected (tuned).

Figure 2:
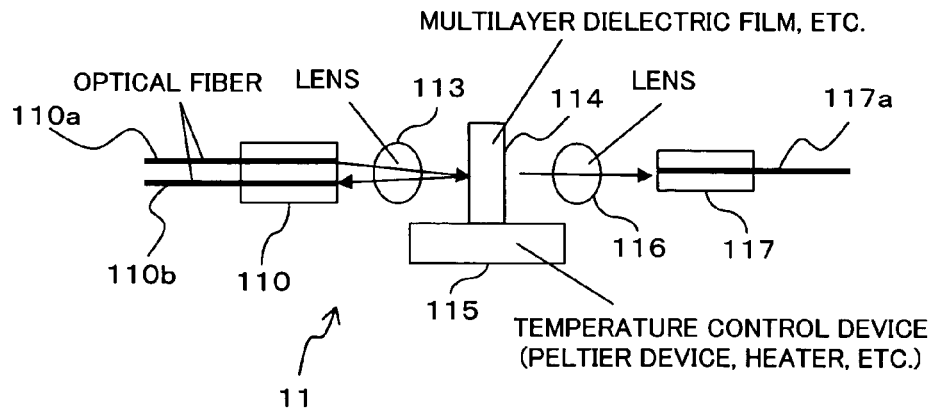
FIG. 2 is a block diagram schematically showing an example construction of the optical receiver in which a multilayer dielectric film is employed to realize the variable-wavelength transmitting unit of FIG. 1.
Figure 3:
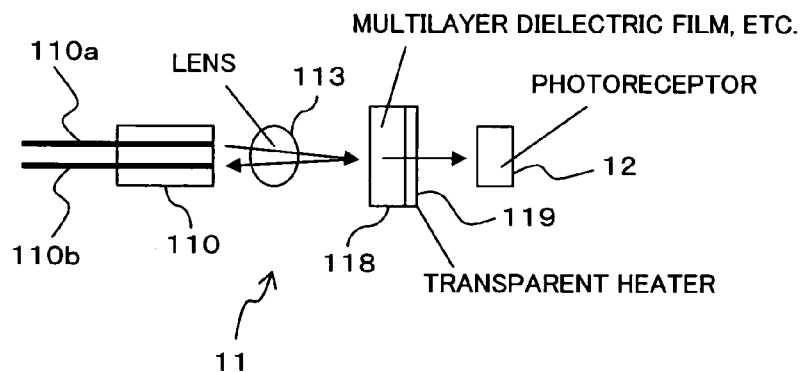
FIG. 3 is a block diagram schematically showing another example construction of the optical receiver in which a multilayer dielectric film is employed to realize the variable-wavelength transmitting unit of FIG. 1.
Figure 4:
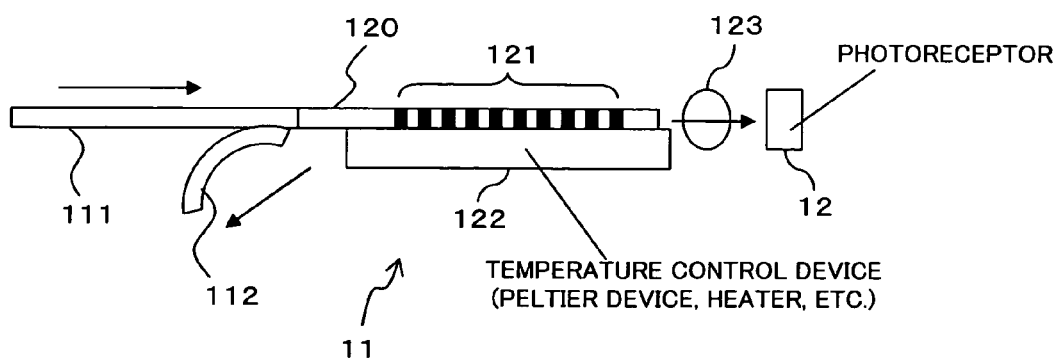
FIG. 4 is a block diagram schematically showing still another example construction of the optical receiver in which a fiber grating is employed to realize the variable-wavelength transmitting unit of FIG. 1.

More precisely, the variable-wavelength transmitting unit 11 includes, for example, a multilayer dielectric film, semiconductor, fiber grating, optical waveguide, or acoustooptic device, singly or in combination, so as to realize a function to vary the wavelength of the light the variable-wavelength transmitting unit 11 transmits, by changing temperature, applying stress, or utilizing surface acoustic waves. FIG. 2, FIG. 3, and FIG. 4 each show a realization of such a variable-wavelength transmitting unit 11.

FIG. 2 depicts an example in which a multilayer dielectric film is employed to realize the variable-wavelength transmitting unit 11. As shown in FIG. 2, the variable-wavelength transmitting unit 11 includes: a fiber connector 110 (twin-core ferrule, or the like) which secures an input optical fiber 110a, connected to the aforementioned optical input terminal 111, and an output optical fiber 110b, connected to the aforementioned optical output terminal 112; lenses 113 and 116; a multilayer dielectric film 114; a temperature control device 115 such as a Peltier device or a heater; and another fiber connector 117 which secures an output optical fiber 117a connected to a photoreceptor 12. Incoming WDM signals input from the input optical fiber 110a passes through the lens 113 and then enters the multilayer dielectric film 114, from which only a light signal at a wavelength of λj is output. The output light signal passes through the lens 116 and then enters the output optical fiber 117a. The light signals at other wavelengths (λk) reflect on the multilayer dielectric film 114, and passes through the input-side lens 113 to enter the output optical fiber 110. That is, the multilayer dielectric film 114 serves as a reflective member that reflects light at a wavelength of λk, which cannot pass through the variable-wavelength transmitting unit 11, to the optical output terminal 112. Here, a central wavelength of the light passing through the variable-wavelength transmitting unit 11 is tuned by controlling the temperature of the multilayer dielectric film 114 with the temperature control device 115.

FIG. 3 shows another example in which a multilayer dielectric film is employed to realize the variable-wavelength transmitting unit 11. In the variable-wavelength transmitting unit 11 of FIG. 3, there is provided, on the output side of the lens 113, a multilayer dielectric film 118, similar to the above multilayer dielectric film 114, with a transparent heater 119 attached thereto for controlling temperature of the multilayer dielectric film 118. Note that some other configuration than a "transparent" heater is also applicable unless an optical path to the photoreceptor 12 is obstructed.

With this construction, the incoming WDM signals from the input optical fiber 110a passes through the lens 113 and enters the multilayer dielectric film 114. Only a light signal at a wavelength of λj is output from the multilayer dielectric film 114 to the photoreceptor 12, and the rest of the light signals at other wavelengths (λk) reflect on the multilayer dielectric film 118 and passes through the lens 113 to enter the output optical fiber 110b. Here, a central wavelength of the light signal passing through the variable-wavelength transmitting unit 11 is tuned by controlling temperature of the transparent heater 119.

FIG. 4 shows still another example in which a fiber grating is employed to realize the variable-wavelength transmitting unit 11. The variable-wavelength transmitting unit 11 of FIG. 4 includes: an optical fiber 120, connected (fused) to an optical fiber forming the aforementioned optical input terminal 111, on which optical fiber 120 formed is a fiber grating 121; a temperature control device 122, such as a Peltier device or a heater, for tuning the central transmittable wavelength of the optical fiber 120 by temperature control; and a lens 123. Incoming WDM signals input from the optical input terminal 111 enters the fiber grating 121 formed on the optical fiber 120, which outputs only a light signal at a wavelength of $\lambda j$, and the output passes through the lens 123 on the output side and then enters the photoreceptor 12. The rest of the light signals at other wavelengths ($\lambda k$) reflect on the fiber grating 121 and are output through the optical output terminal 112 formed by a directional coupler or the like.

The photoreceptor 12 of FIG. 1, which is formed by a photoelectrical converter such as a PIN photodiode or an avalanche photodiode, receives light that has passed through the variable-wavelength transmitting unit 11 and generates an electric (electric current) signal according to the level of the received light. The preliminary amplifier 13 and the main amplifier 14 function as a current-voltage (IV transducer amplifier) for amplifying photoelectric current which has undergone photoelectric conversion performed by the photoreceptor 12. The CDR circuit 15 shapes the waveform of the thus amplified signal to reproduce the clock and the data of the received signal, and the reproduced clock and data are then sent to a logic circuit (signal processing unit; not shown).

The AGC circuit 16 monitors the output level (electric potential) of the main amplifier 14 so as to prevent waveform deterioration due to, for example, an output of the main amplifier 14 being saturated. According to the output level, the AGC circuit 16 changes the gain of the amplifier 14 and tunes the central wavelength of the light passing through the variable-wavelength transmitting unit 11. That is, the AGC circuit 16 serves also as a control means for controlling the central wavelength of light passing through the variable-wavelength transmitting unit 11 so that the level of the light signal passing through the variable-wavelength transmitting unit 11 becomes the maximum. In this instance, it is possible to perform the tuning of the central wavelength independently of gain control in the main amplifier 14.

Here, the electric potential detected by the AGC circuit 16 is a function of intensity of the light signal, a proportional relationship between the potential and the intensity being thus revealed. Accordingly, when the greatest potential is detected, the greatest intensity of light is input to the photoreceptor 12. Therefore, if the variable-wavelength transmitting unit 11 placed before the photoreceptor 12 is incapable of transmitting a to-be-detected (transmitted) light signal at a wavelength of $\lambda j$, or if the unit 11 is capable of transmitting only part of the light signal, the central wavelength is swept across a desired wavelength range when power is turned on, so as to perform controlling such that the above amplifier output potential becomes the maximum, the central wavelength thereby being made close to a wavelength of $\lambda j$, which should pass through the variable-wavelength transmitting unit 11.

With this construction, in the optical receiver 1 according to the present embodiment, only a light signal at a wavelength of $\lambda j$, which can pass through the variable-wavelength transmitting unit 11 (or which is to be received by the optical receiver 1), is transmitted (wavelength-selectively split) to the photoreceptor 12, and the rest of the light signals at other wavelengths ($\lambda j$) is reflected to the optical output terminal 112 to be output outside the optical receiver 1.

Figure 5:
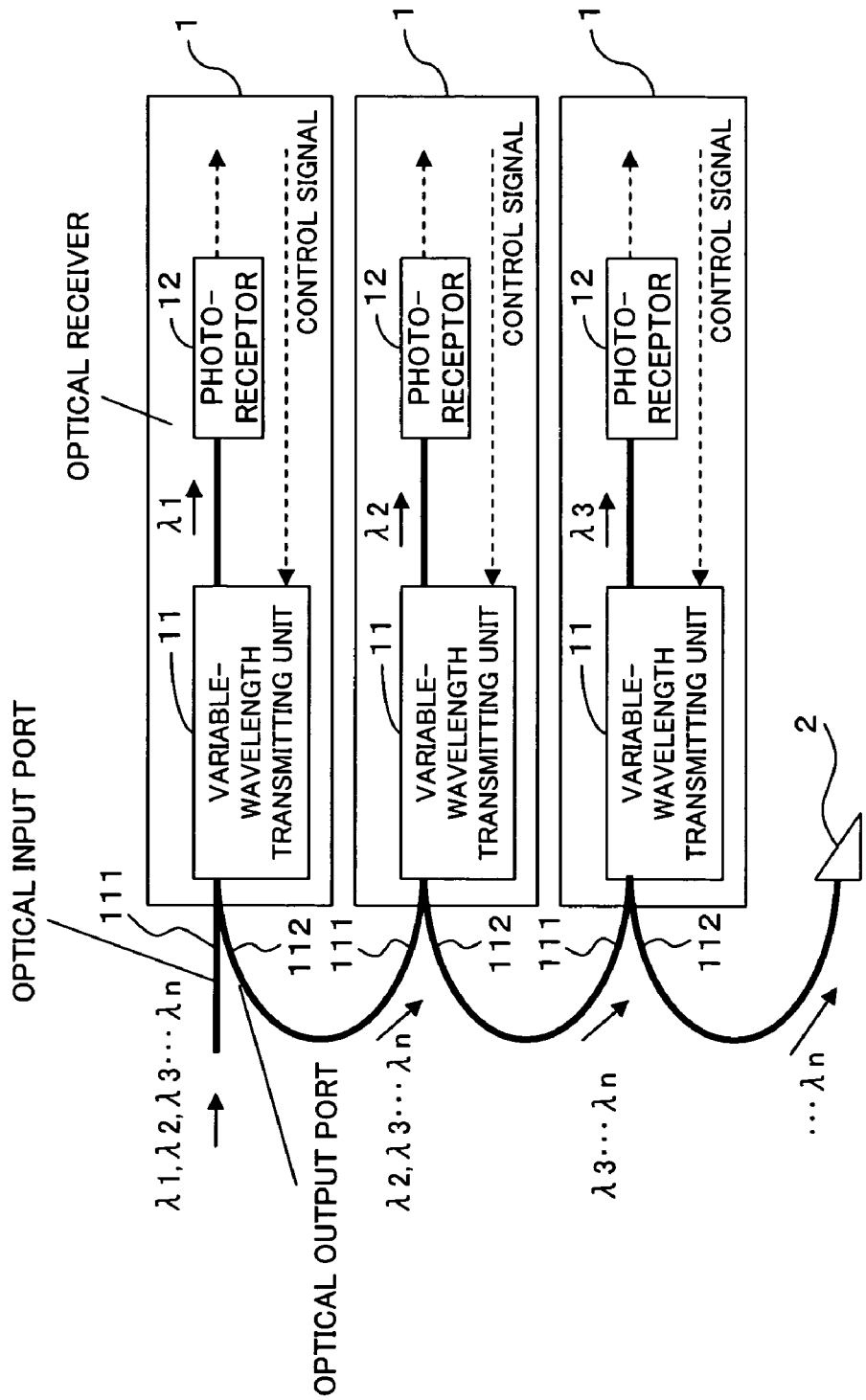
FIG. 5 is a block diagram schematically sowing an optical signal receiving system in which optical receivers of FIG. 1 are cascaded.

Accordingly, as shown in FIG. 5, for example, N (N is an integer number greater than 2) optical receivers 1 identical in construction are prepared, and the optical output terminal 112 of the ith ($i=1$ to $N-1$) optical receiver 1 is connected to the optical input terminal 111 of the next $[(i+1)th]$ optical receiver 1, thereby making it possible for each individual optical receiver 1 to selectively receive a light signal at a wavelength of $\lambda j$, which is to be received by the individual optical receiver 1. In FIG. 5, connection after the photoreceptor 12 of FIG. 1 and control loops for the variable-wavelength transmitting unit 11 and the amplifier 14 are omitted from the illustration.

That is, the optical input terminal 111 of the first optical receiver 1 receives incoming WDM signals at wavelengths of $\lambda 1, \lambda 2, \lambda 3, \ldots, \lambda n$ multiplexed therein, and the light signal at a wavelength of $\lambda 1$ passes through the variable-wavelength transmitting unit 11 of the first optical receiver 1 to enter the photoreceptor 12. The remaining light signals at other wavelengths of $\lambda 2, \lambda 3, \ldots, \lambda n$ are reflected from the variable-wavelength transmitting unit 11 to the optical output terminal 112, and then handed over to the following (second) optical receiver 1.

In the second optical receiver 1, the variable-wavelength transmitting unit 11 is controlled to have a central wavelength such that only a light signal at a wavelength of $\lambda 2$ can pass through the variable-wavelength transmitting unit 11 to enter the photoreceptor 12. The remaining light signals at other wavelengths of $\lambda 3, \lambda 4, \ldots, \lambda n$ are reflected from the variable-wavelength transmitting unit 11 to the optical output terminal 112, and then enter the following (third) optical receiver 1. After this, only a light signal at a wavelength of $\lambda j$, which is to be received by an individual optical receiver 1, passes through the variable-wavelength transmitting unit 11 of the individual optical receiver 1, and the remaining light signals at other wavelengths are likewise handed over, one to each of the following optical receivers 1, one by one. If the optical output terminal 112 of the last optical receiver 1 still receives unnecessary light, an optical terminating device 2 is connected to the optical output terminal 112. Alternatively, the optical output terminal 112 of the last optical receiver 1 can be connected to some other system for another use, such as a signal monitoring system, or to another communication network via an optical amplifier.

In this manner, each individual optical receiver 1 is capable of selectively receiving a required light signal at a wavelength of $\lambda j$, out of all the incoming WDM signals. Therefore, when increasing a channel count to be multiplexed in the WDM signals, it only needs to add a required number of optical receivers 1 with the same construction as that of FIG. 1 in place of the optical terminating device 2. As a result, at initial installation of the WDM system it is no longer required to prepare an expensive optical demultiplexer with an unnecessarily great number of ports, and it is possible to add a required number of optical receivers 1 as the needs arise, thereby flexibly accommodating increase (or decrease) in number of combined channels in the WDM signals, so that the cost of initial installation of the WDM transmission apparatus and the WDM transmission system can be greatly reduced. Further, it is also possible to give the apparatus and the system the flexibility in changing channel spacing of WDM signals on the sender end even after installation of the system.

In addition, if the variable-wavelength transmitting unit 11 is given a transmittable wavelength bandwidth that is narrower than channel spacing of WDM signals and also slightly wider than the spectral width (signal wavelength width) of an individual signal on each channel, the central wavelength of light passing through the variable-wavelength transmitting unit 11 is adaptively tuned by the AGC circuit 16 to follow a target optical transmission channel, so that noise light, such as ASE light or the like, is efficiently prohibited entering the optical receivers 1, thereby improving receive sensitivity. Here, it is to be noted that the phrase "slightly wider than the signal wavelength width" means "being equal to or greater than a spectral width (−20 dB wide) such that the optical receive sensitivity of the optical receiver 1 is not deteriorated by 20 dB or more.

Figure 6:
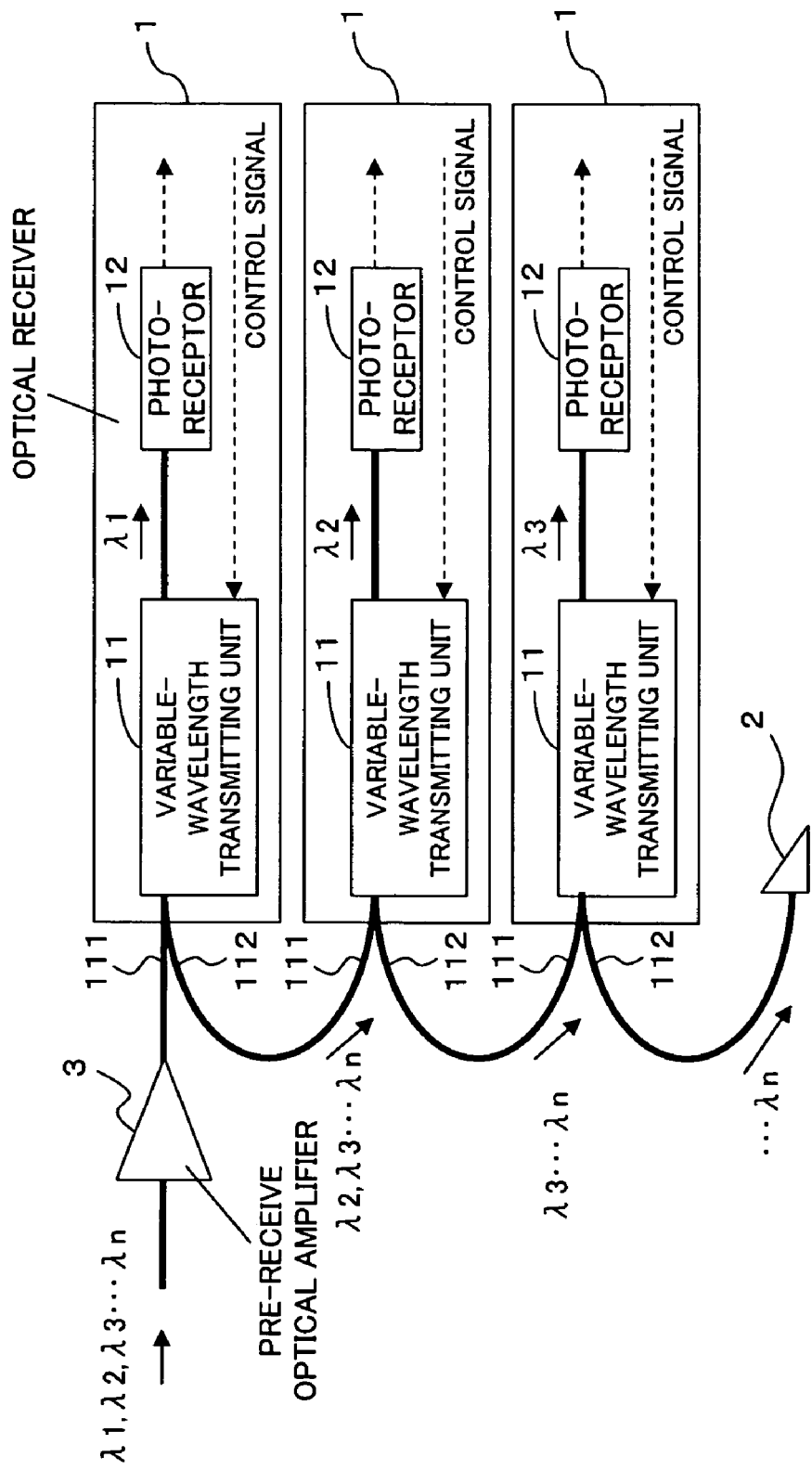
FIG. 6 is a block diagram schematically showing a construction in which an optical amplifier is disposed before the first optical receiver of FIG. 5.

Accordingly, as shown in FIG. 6, before the first optical receiver 1 there is provided a pre-receive optical amplifier (hereinafter simply called the "optical amplifier") 3, such as an erbium-doped optical fiber (EDF) amplifier. This arrangement is advantageous in that noise light can be efficiently suppressed even in a system where collective amplification of WDM signals at different wavelengths tends to increase effects of noise light such as ASE light, thereby lengthening distance the WDM signals can be transmitted.

Generally speaking, in WDM transmission systems, there is provided an optical amplifier before an optical receiver to amplify incoming light signals, having been attenuated during transmission, up to an intensity exceeding the minimal receive sensitivity of the optical receiver, thereby increasing transmission distance. However, optical amplifiers commonly emit ASE light, which serves as noise light, and thus, unless this ASE light is suppressed, the transmission distance will be shortened instead of being lengthened.

Figure 7:
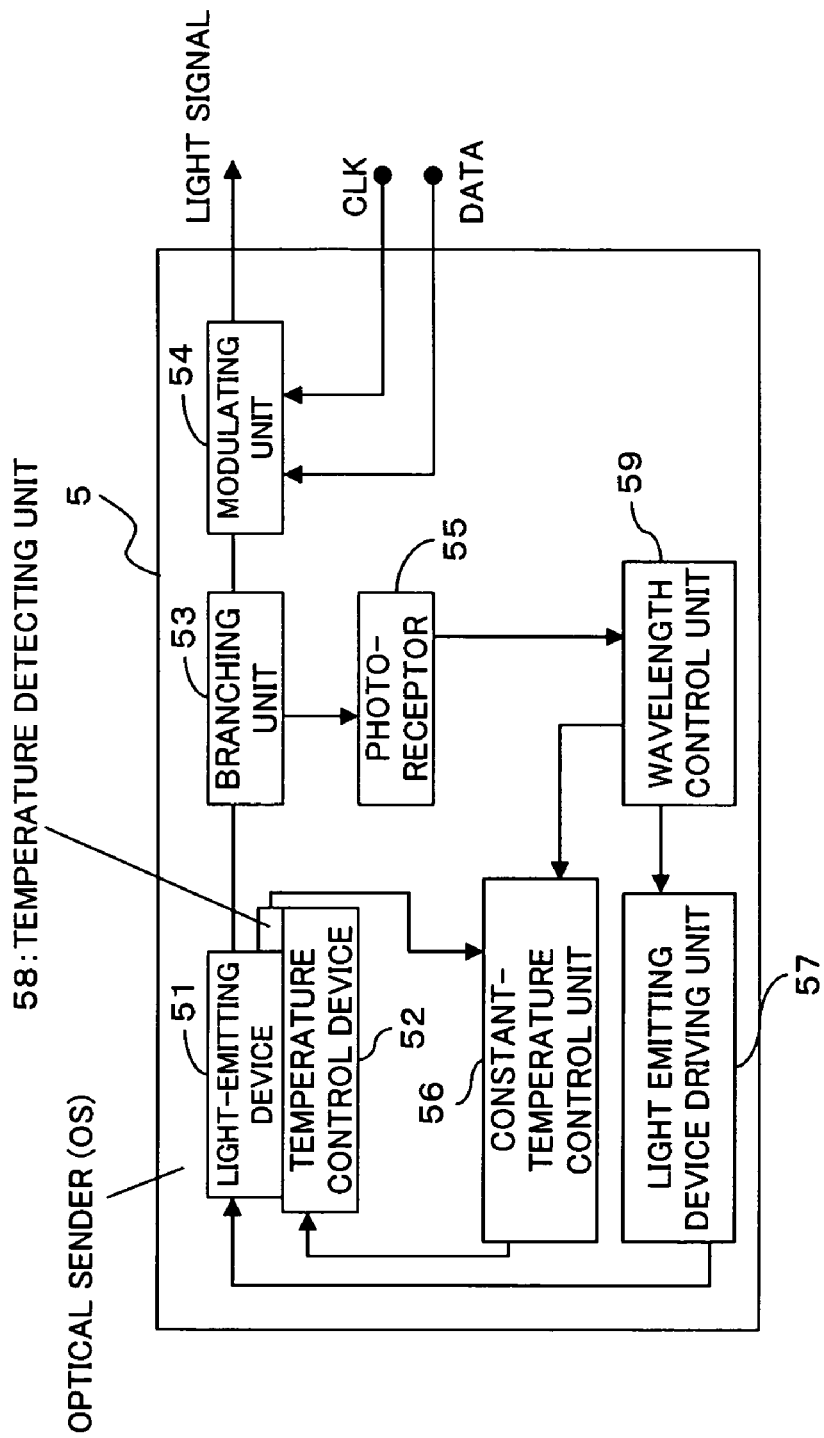
FIG. 7 is a block diagram schematically showing a construction of essential part of an optical sender for use in DWDM systems.
Figure 9:
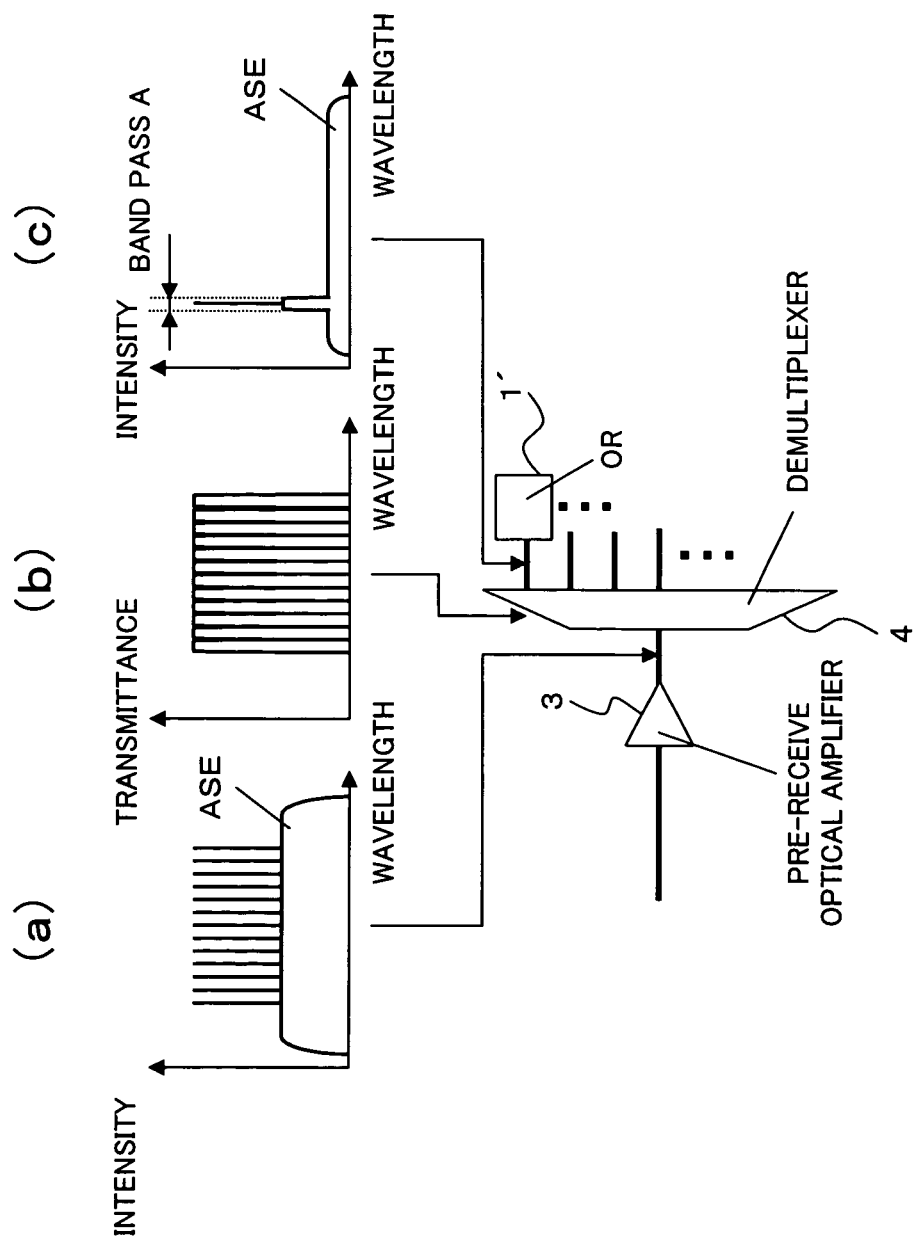
FIG. 9 is a view for describing received spectra in a DWDM system.

Common DWDM systems in which signal channels are closely spaced employ an optical sender (OS) 5, as shown in FIG. 7, which includes: a light-emitting device 51 such as a semiconductor laser or the like; a temperature control device 52 having a temperature detecting device 58, such as a Peltier device or a heater, for adjusting the wavelength from the light-emitting device 51 by temperature; a branching unit 53 for branching light from the light-emitting device 51 into two, one is then output as light to be subjected to modulation and the other is then output as monitor light; a modulating unit 54 for modulating and sending the light from the branching unit 53; a photoreceptor 55, such as a PIN photodiode, for receiving the monitor light from the branching unit 53 and outputting an electric current signal generated according to the amount of the received light; a constant-temperature control unit 56 for controlling the light-emitting device 51 to maintain a constant temperature; a light-emitting device driving unit 57 for controlling the oscillation wavelength of the light-emitting device 51; and a wavelength control unit 59 for controlling the oscillation wavelength of the light-emitting device 51 to be constant, by controlling the constant-temperature control unit 56 and the light-emitting device driving unit 57 based on the electric current signal generated by the photoreceptor 55, so as to perform accurate wavelength control. As shown in FIG. 9, for example, signals are spaced 0.4 nm to 1.6 nm (band pass A) apart in DWDM systems. Note that, part (a) in FIG. 9 illustrates a spectrum of output light of the optical amplifier 3; part (b), a wavelength characteristic of a signal passing through the optical demultiplexer 4; part (c), an example of a spectrum of output light of the optical demultiplexer 4.

In this manner, in a DWDM system, where channels are closely spaced, the wavelength width (band pass A) extracted by the optical demultiplexer 4 is set at least to be slightly narrower than channel spacing in the system. As a result, it is possible to sufficiently suppress ASE light generated at optical amplification by the optical amplifier 3, so that a previous optical receiver 1' can be employed without significantly deteriorating receive sensitivity by ASE noise.

Figure 8:
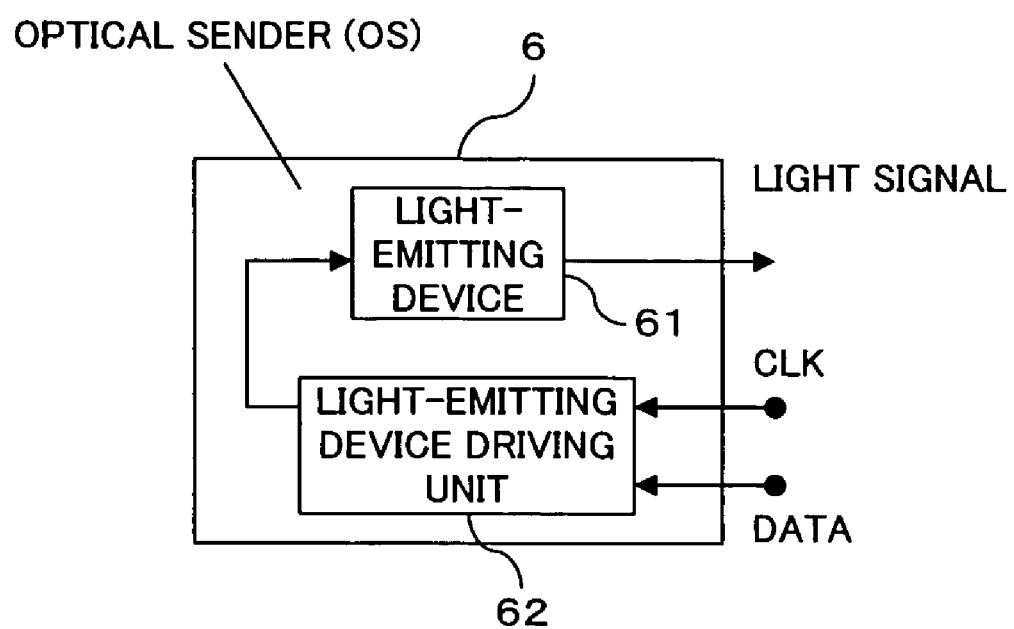
FIG. 8 is a block diagram schematically showing a construction of essential part of an optical sender for use in CWDM systems.

In contrast to this, CWDM systems use the optical sender (OS) 6 of FIG. 8, which simply includes a light-emitting device 61, such as a semiconductor laser, and a light-emitting device driving unit 62 for driving the light-emitting device 61. Since such a simple optical sender 6 does not perform accurate wavelength control, wavelengths tend to be varied due to manufacture variations, temperature variations, or driving current variations. In addition, even if the manufacture variations are successfully prevented, a temperature-dependent wavelength variation of around 0.1 nm/° C. generally appears.

Figure 10:
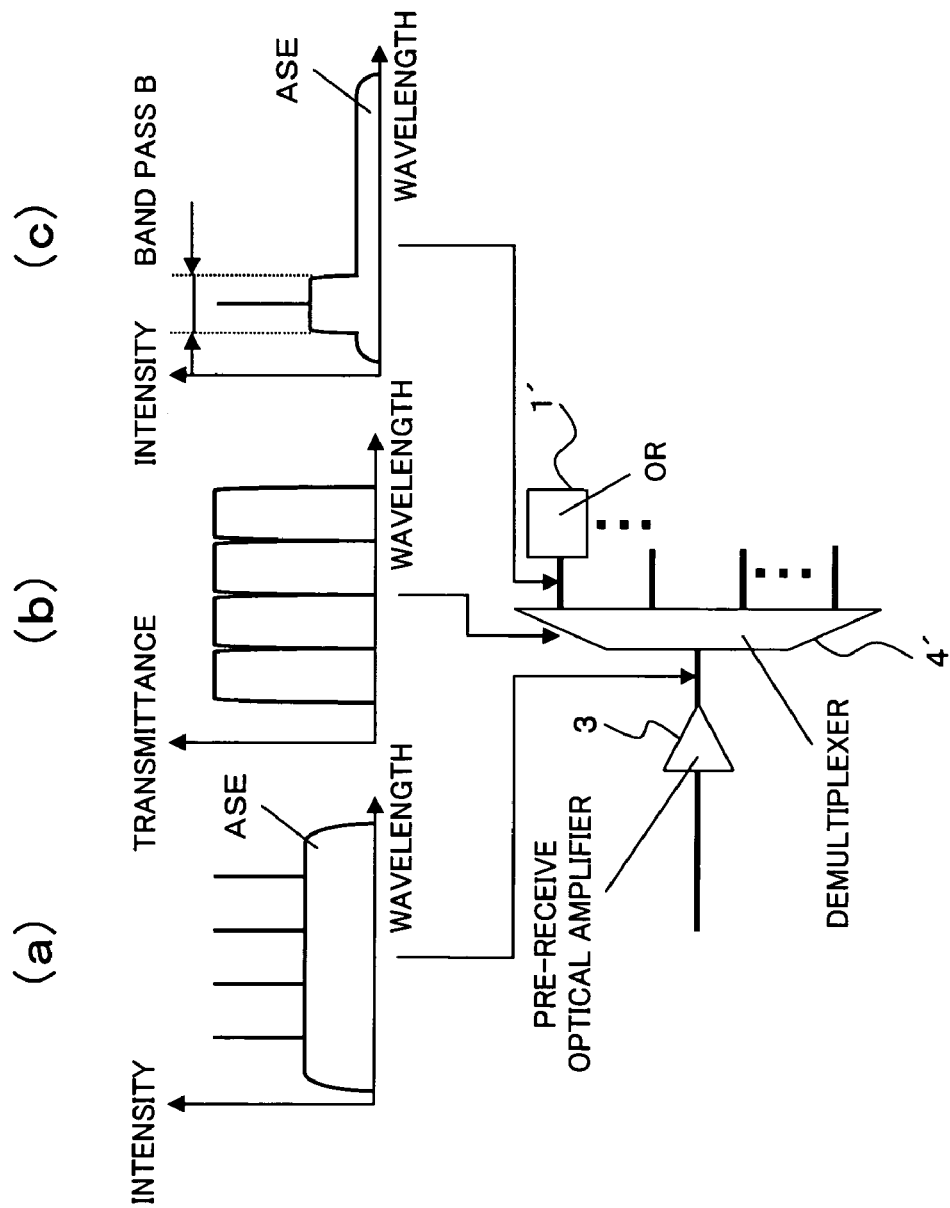
FIG. 10 is a view for describing received spectra in a CWDM system.

In view of these, as shown in FIG. 10, the bandwidth extracted by the optical demultiplexer 4' needs to be as wide as 13 nm to 14 nm (band pass B), or 10 to 40 times as wide as the channel spacing in DWDM systems. As a result, a great amount of ASE light due to the optical amplifier 3 enters the optical receiver 1' (see part (c) in FIG. 10), thereby deteriorating the receive sensitivity of the optical receiver 1', so that no improvement in transmission distance is brought about by the optical amplifier 3. Here, note that, part (a) in FIG. 10 illustrates a spectrum of output light of the optical amplifier 3; part (b), a wavelength characteristic of a signal passing through the optical demultiplexer 4; part (c), an example of a spectrum of output light of the optical demultiplexer 4.

Figure 11:
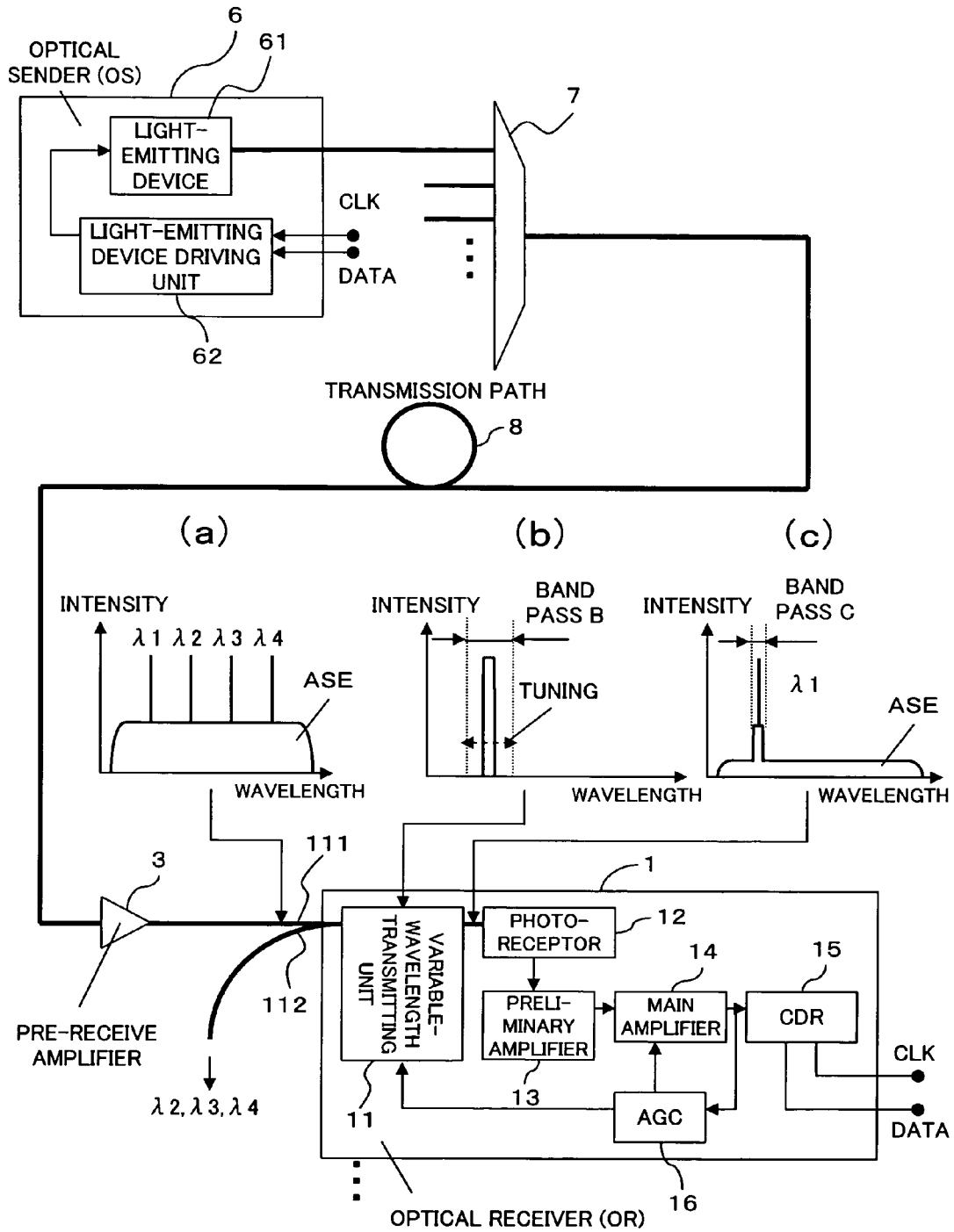
FIG. 11 is a block diagram schematically showing an example of a CWDM system which employs the optical receiver of FIG. 1.

[B] Description of the WDM transmission system:

As shown in FIG. 11, in a CWDM system including an optical receiver 1 of the present embodiment, even if an optical amplifier 3 is disposed before the optical receiver 1, noise light, such as ASE light, entering the optical receiver 1 (photoreceptor 12) is suppressed to the minimum, thereby preventing the receive sensitivity of the optical receiver 1 being deteriorated, so that WDM signals can be transmitted a longer distance than in a previous system. In FIG. 11, reference number 7 denotes an optical multiplexer, which combines output light from the optical senders 6 provided, one for each of the transmission (signal) channels (in FIG. 11, four channels of $\lambda 1$, $\lambda 2$, $\lambda 3$, and $\lambda 4$), to send-out the combined signal light to an optical transmission path (optical fiber) 8.

That is, an output spectrum of the optical amplifier 3 as shown in part (a) of FIG. 11 includes not only signal wavelengths of $\lambda 1$, $\lambda 2$, $\lambda 3$, and $\lambda 4$ but also ASE light. However, according to the optical receiver 1 of the present embodiment, the bandwidth the variable-wavelength transmitting unit 11 demultiplexes (transmits) is tuned to be narrower than channel spacing (around 13 nm to 14 nm, for example) in the CWDM system and also slightly wider than the signal wavelength width in the system, or around 2 nm, for example [band pass C (see part (c) of FIG. 11)]. As shown in part (b) of FIG. 11, the central wavelength of the light passing through the variable-wavelength transmitting unit 11 is tuned within a range of wavelengths in band pass B.

This makes it possible to minimize the amount of ASE light, at wavelengths outside the band pass C, entering the photoreceptor 12, so that deterioration of receive sensitivity caused by ASE light is also minimized. In addition, even if the transmission wavelength of the optical sender 6 is varied due to temperature variations during operation of the system, the central wavelength of light passing through the variable-wavelength transmitting unit 11 is adaptively tuned by the AGC circuit 16 to follow a target optical transmission channel, so that deterioration of the receive intensity of light signals can be prevented.

Although the present example shows an application of the optical receiver 1 in a CWDM transmission system, it can of course be applied to a DWDM transmission system, too. This application realizes similar advantages to the above: initial installation cost is minimized; the number of channels can be flexibly increased or decreased; the amount of ASE light which is generated at the optical amplifier 3 and enters the photoreceptor 12 is efficiently minimized.

Further, multiple optical receivers 1 are cascaded to pick off a series of wavelengths, one wavelength at a time. The variable-wavelength transmitting unit 11 of each optical receiver 1 transmits one wavelength and reflects other untransmittable wavelengths so that light signals at wavelengths ($\lambda$k) untransmittable through the variable-wavelength transmitting unit 11 to the following optical receiver 1. During the process, the light signal level will be gradually lowered, and thus, one or more optical amplifiers can be interposed between two or more of the optical receivers 1. Such optical amplifiers interposed between the optical receivers 1 will not affect minimization of effects of ASE light. In other words, such optical receivers 1 of the present embodiment that are capable of minimizing the effects of ASE light, permit an optical amplifier to be disposed in between the optical receivers 1.

Figure 12:
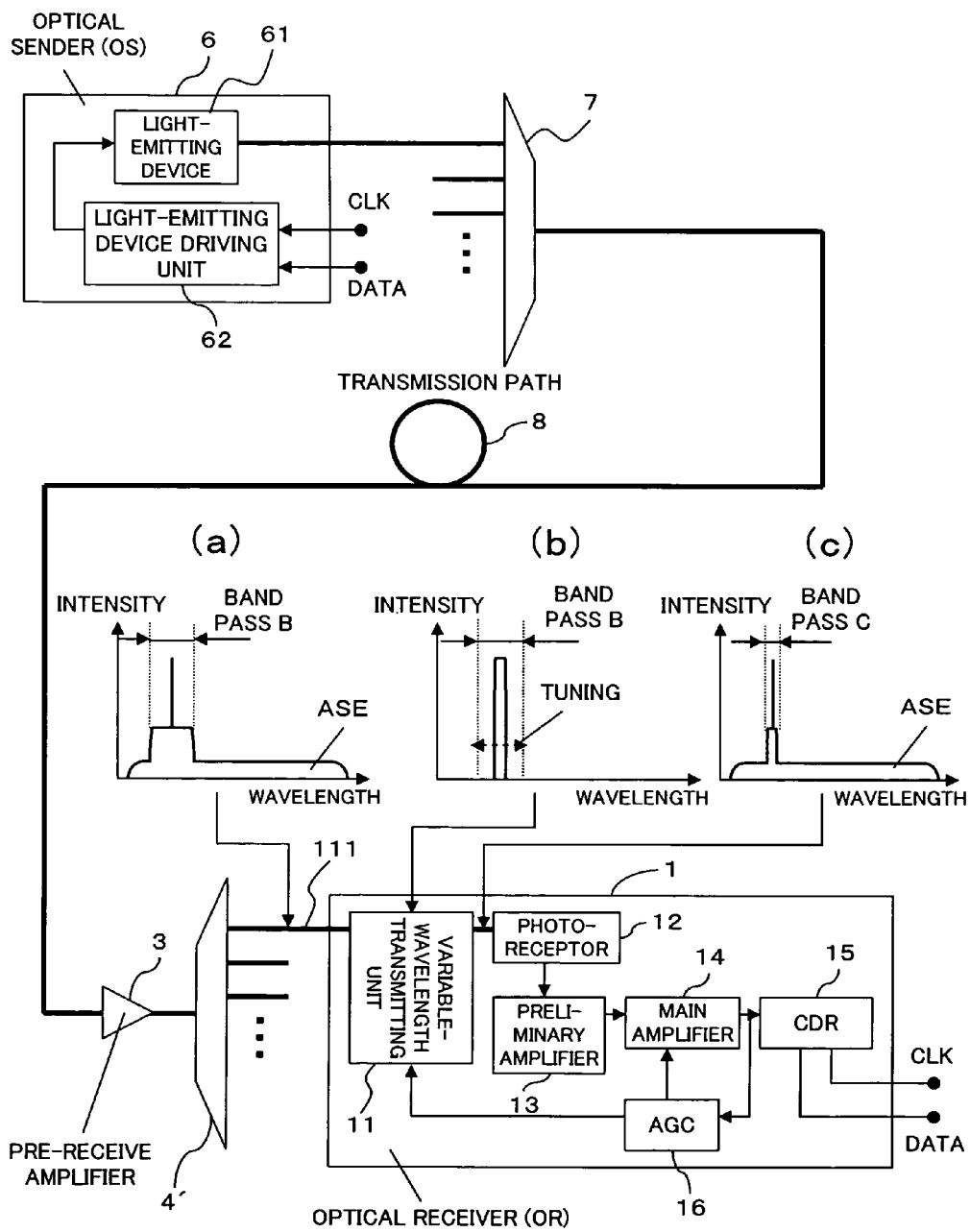
FIG. 12 is another example of a CWDM system which employs the optical receiver of FIG. 1.

Still further, in the system of FIG. 11, multiple optical receivers 1, one for each channel being multiplexed, are cascaded as shown in FIG. 5 and FIG. 6, thereby being applied as an optical transmission apparatus (optical receiving system). However, as shown in FIG. 12, the previous optical demultiplexer 4' can also be employed together with optical receivers 1, one for each channel, the optical receivers 1 being disposed after the optical demultiplexer 4'. In this case, the variable-wavelength transmitting unit 11 needs to have neither an optical output port 112 nor a reflective member for reflecting light at untransmittable wavelengths to the optical output port 112. Like reference numbers and characters designate similar parts or elements throughout several views of the present embodiment and the conventional art, so their detailed description is omitted here.

Figure 13:
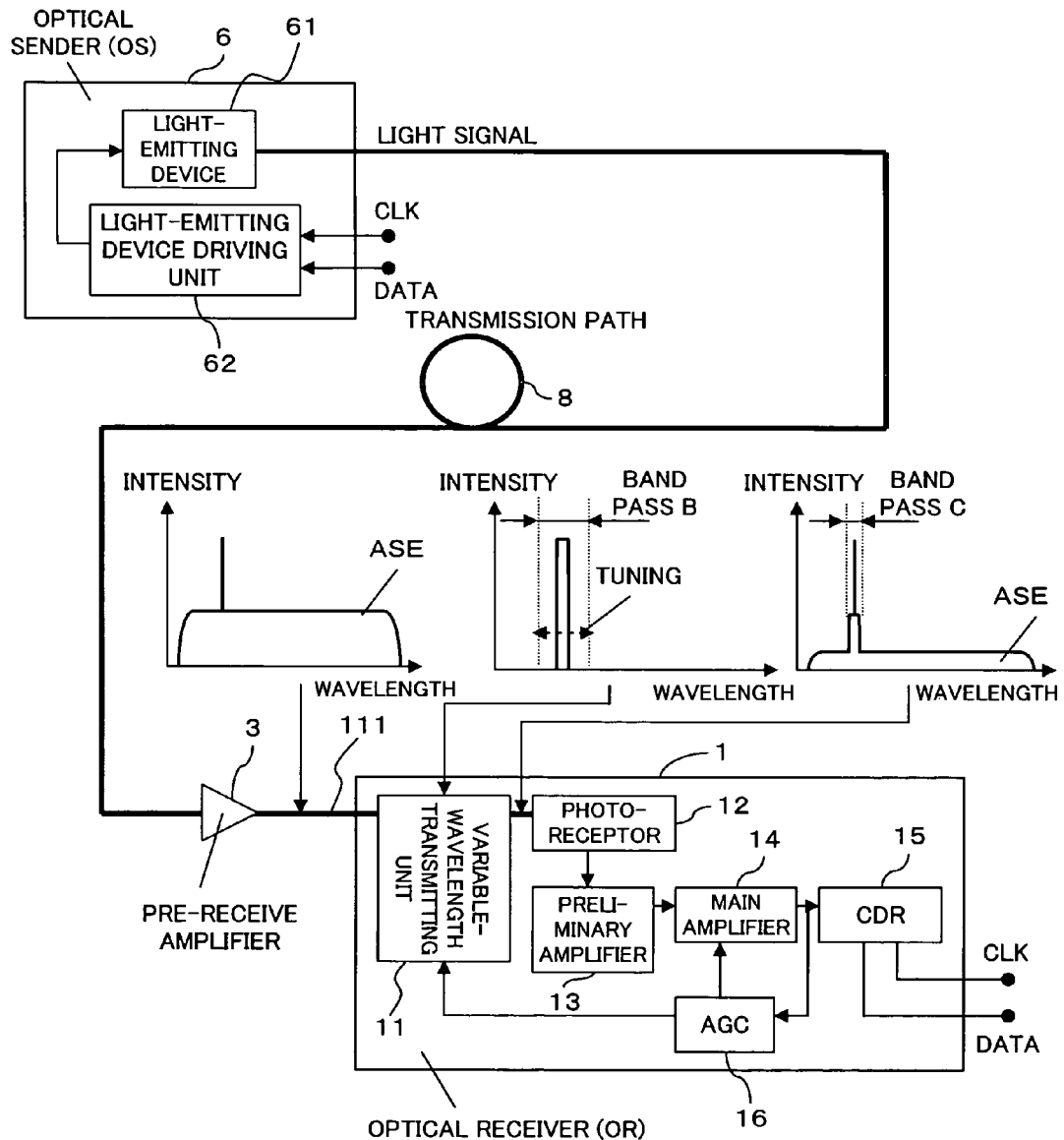
FIG. 13 is still another example of a CWDM system which employs the optical receiver of FIG. 1.

In this manner, the optical transmission apparatus includes a previous optical demultiplexer 4' disposed after the optical amplifier 3, which optical demultiplexer 4' wavelength-selectively splits incoming WDM signals to the optical receivers 1, one for each wavelength. This arrangement has the following advantages: the amount of ASE light entering the photoreceptor 12 is minimized; the necessity of accurate control of the wavelengths of transmission signals is eliminated; even if the transmission wavelength of the optical sender 6 is varied due to temperature variations during operation of the system, the AGC circuit 16 makes the variable-wavelength transmitting unit 11 approximate to an optimal wavelength position. These advantages are likewise realized in the system of FIG. 13 where a light signal is transmitted on one single channel.

In this manner, according to the optical receiver 1 of the present embodiment, the variable-wavelength transmitting unit 11 selectively picks off (transmits) a light signal at a desired wavelength from incoming WDM signals while tuning the central wavelength of the light signal passing through the variable-wavelength transmitting unit 11, and the remaining light signals at other wavelengths are output to the following optical receiver 1 through the optical output port 112, so that the WDM signals can be split among separate receivers for each wavelength, without the necessity of an optical demultiplexer being employed. In consequence, it is possible to provide a WDM transmission apparatus and a WDM transmission system at reasonable costs which are flexible in changing channel spacing and a channel count.

Moreover, the variable-wavelength transmitting unit 11 transmits the wavelength bandwidth that is narrower than channel spacing of WDM signals and also slightly wider than the signal wavelength width of an individual signal on each channel, so that the amount of noise component light, such as ASE light, other than signal wavelengths is greatly minimized, thereby also minimizing deterioration of the receive sensitivity of the optical receiver 1.

[C] Others:

Although the foregoing embodiment describes an example in which a variable-wavelength transmitting unit 11 is employed in the receiver end (optical receiver 1), the variable-wavelength transmitting unit 11 can alternatively be provided for the sender end (optical sender).

Figure 14:
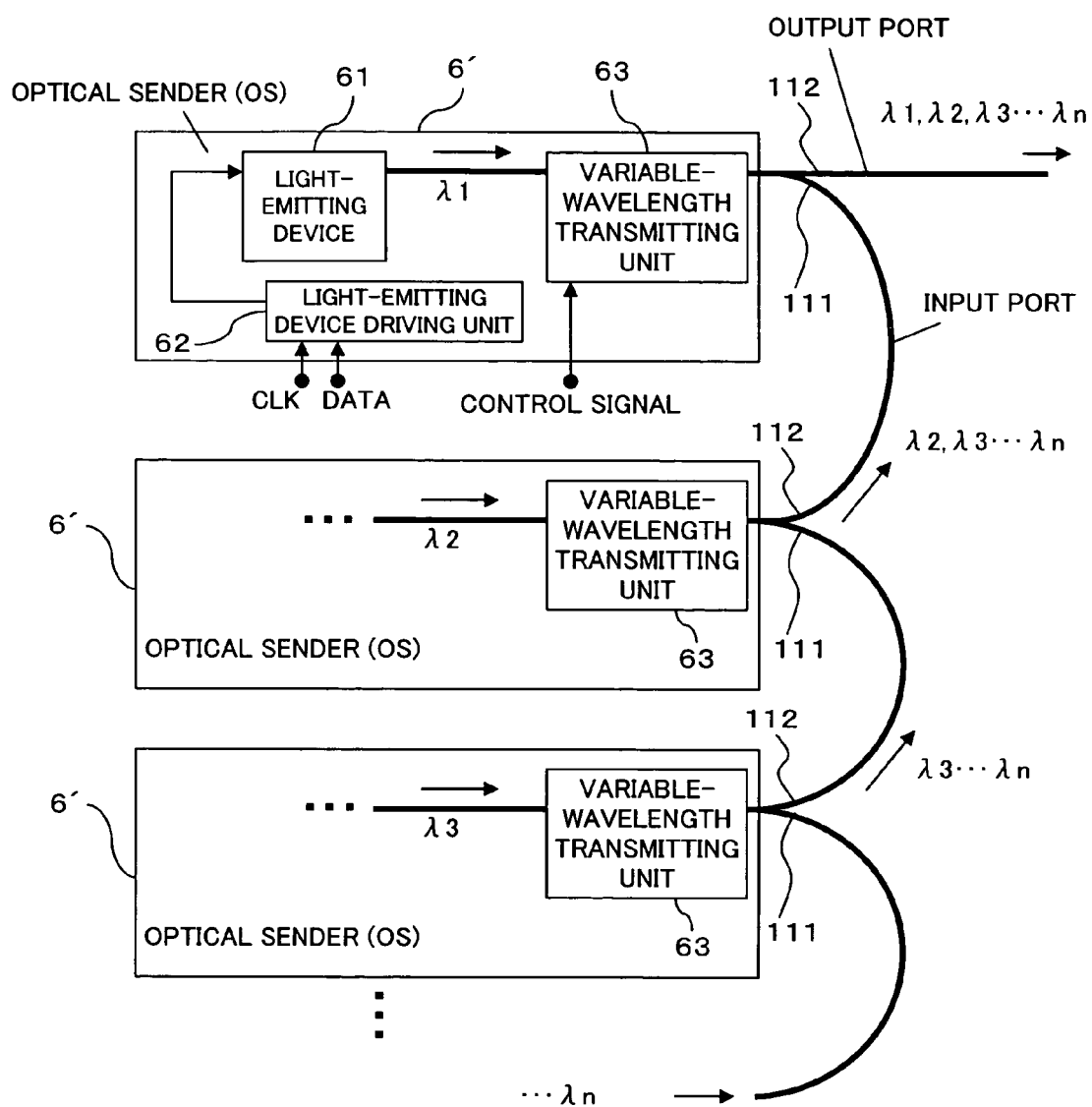
FIG. 14 is a block diagram schematically showing a construction in which a variable-wavelength transmitting unit of the present embodiment is applied to the optical transmitter of FIG. 8, which is for use in CWDM systems, such optical transmitters being cascaded.

For instance, as shown in FIG. 14, a variable-wavelength transmitting unit 63, similar to the variable-wavelength transmitting unit 11, is provided for the optical sender 6 included in the CDWM system of FIG. 8. As in the case of the construction of FIG. 5, the optical input port 111 of the mth (m=1 to n; n is an integer number greater than 2) optical sender 6' is connected to the optical output port 112 of the following [(i+1)th] optical sender 6. Here, the light-emitting device 61 and the light-emitting device driving unit 62 are the same as those that have been described with reference to FIG. 8.

Then, a clock (CLK) signal, and a data signal, and a control signal for controlling the variable-wavelength transmitting unit are given from an external apparatus or system. At this time, the variable-wavelength transmitting unit 63 is controlled in advance to transmit an oscillation wavelength of $\lambda$i generated by the light-emitting device 61 of the ith optical sender 6' and to reflect other wavelengths ($\lambda$k). The transmission light signal (at a wavelength of $\lambda$i) output from the ith optical sender 6' passes through the variable-wavelength transmitting unit 63, and light signals at other wavelengths ($\lambda$k) (k$\neq$i), input through the optical input port 111, are reflected from the variable-wavelength transmitting unit 63 to be combined with the light signal at a wavelength of $\lambda$i and then output to the optical output port 112.

Eventually, light signals at wavelengths of $\lambda$1 to $\lambda$n are output as WDM signals from the optical output terminal 112 of the first optical sender 6'.

Figure 15:
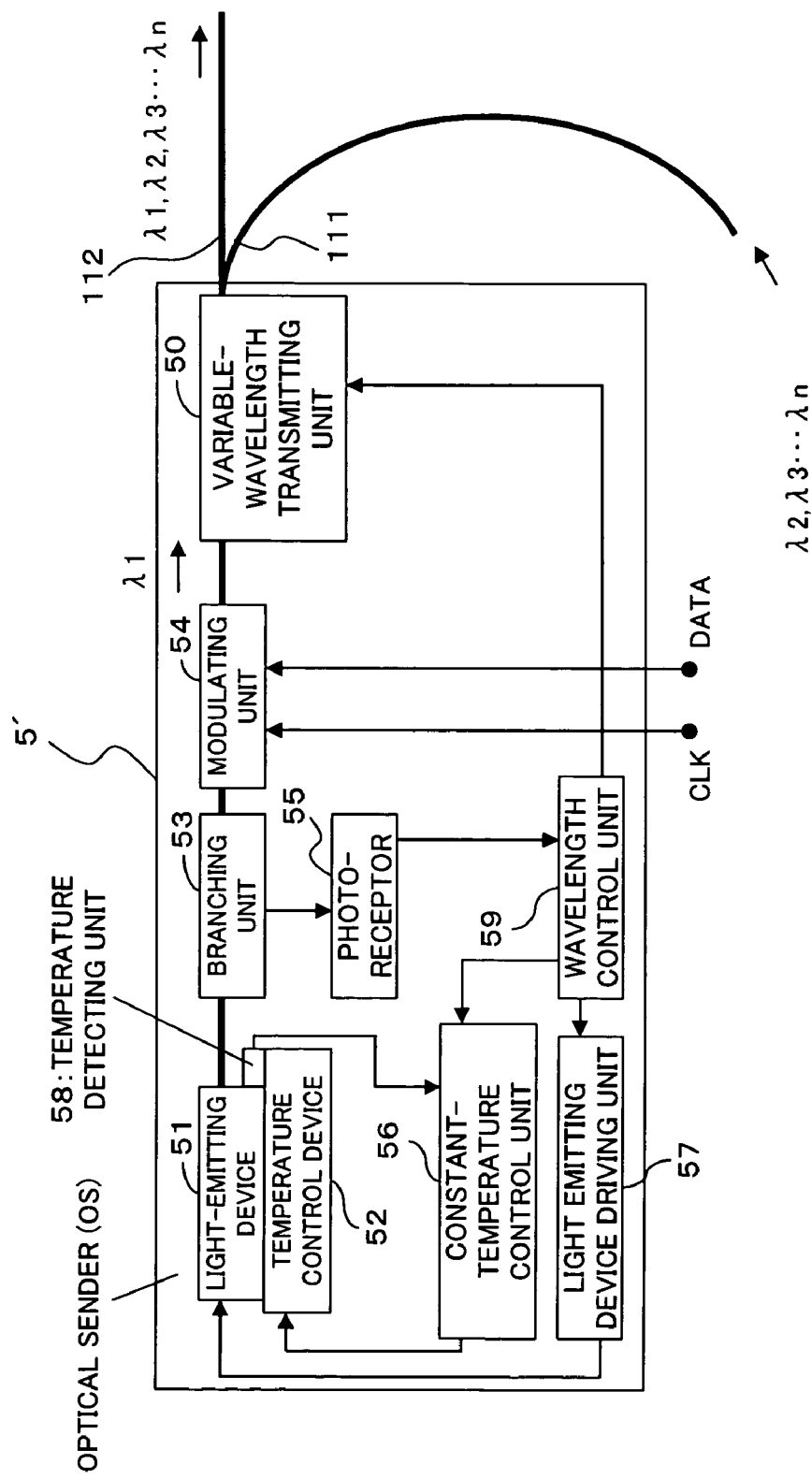
FIG. 15 is a block diagram schematically showing a construction in which a variable-wavelength transmitting unit of the present embodiment is applied to the optical transmitter of FIG. 7, which is for use in CWDM systems, such optical transmitters being cascaded.
Figure 16:
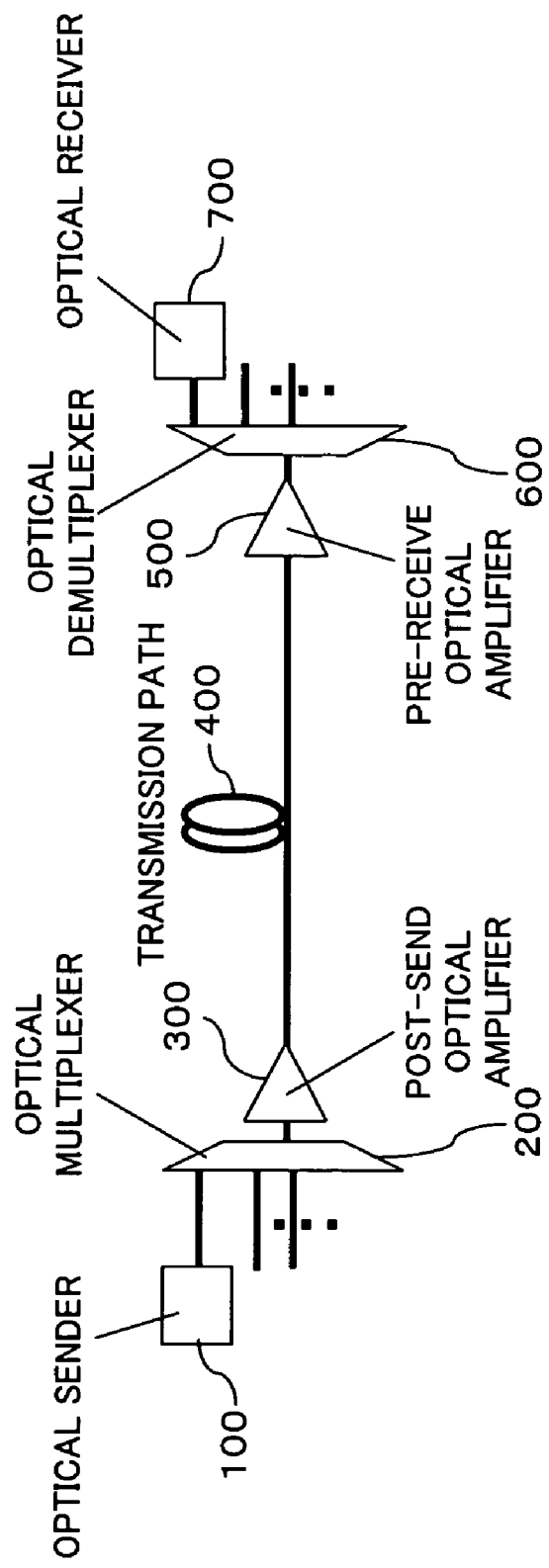
FIG. 16 is a block diagram schematically showing a construction of a previous WDM transmission system.

In the meantime, as for the optical sender 5 of FIG. 7 for use in DWDM systems, a variable-wavelength transmitting unit is also applicable thereto. As shown in FIG. 15, for example, a variable-wavelength transmitting unit 50, similar to the above-described variable-wavelength transmitting unit 11, is disposed on the output side of the modulating unit 54, and the optical input port 111 of the mth optical sender 5' is connected to the optical output port 112 of the following [(i+1)th] optical sender 5'. As in the case of the optical sender 5 for use in CWDM systems, the transmission light signal (at a wavelength of $\lambda$i) output from the ith optical sender 5' passes through the variable-wavelength transmitting unit 50, and light signals at other wavelengths ($\lambda$k) (k$\neq$i), input through the optical input port 111, are reflected from the variable-wavelength transmitting unit 50 to be combined with the light signal at a wavelength of $\lambda$i and then output to the optical output port 112. In this case, the wavelength control unit 59 of the optical sender 5' controls the variable-wavelength transmitting unit 50 to transmit only an oscillation wavelength of $\lambda i$ while reflecting other wavelengths ($\lambda k$). This control information is set in, for example, a memory or the like not shown.

In this manner, on the sender end, it is also possible to increase and decrease the number of optical senders, 6' and 5', as necessary, so that the cost of initial installation of the WDM transmission apparatus and the WDM transmission system can be greatly reduced.

Moreover, it is needless to say that the present invention should by no means be limited to the above-illustrated embodiment, and various changes or modifications may be suggested without departing from the gist of the invention.

As has been described above, the present invention flexibly accommodates increase in number of channels combined in a WDM system, and adaptively minimizes ASE noise even in a CWDM system with wide channel spacing, thus suggesting a great usefulness in the optical communication field.

What is claimed is:

1. An optical receiver, comprising:
    an optical input port which receives incoming wavelength-division multiplexed (WDM) light signals;
    transmittable-wavelength-variable filtering means which allows or permits, a light signal in a predetermined transmittable wavelength bandwidth to pass therethrough, out of the WDM light signals input from said optical input port, the light signal to be selectively received by the optical receiver, wherein a central wavelength of said transmittable wavelength bandwidth being a desired wavelength;
    an optical output port which outputs the remaining light signals out of the WDM light signals input from said optical input port, at wavelengths which do not pass through said transmittable-wavelength-variable filtering means; and
    control means which controls the central wavelength of said transmittable-wavelength-variable filtering means in such a manner that the level of the light signal passing through said transmittable-wavelength-variable filtering means is the maximum.

2. An optical receiver, comprising:
    an optical input port which receives incoming wavelength-division multiplexed (WDM) light signals:
    transmittable-wavelength-variable filtering means which allows or permits, of the WDM light signals input from said optical input port, a light signal in a predetermined transmittable wavelength bandwidth to pass therethrough, a central wavelength of said transmittable wavelength bandwidth being a desired wavelength;
    an optical output port which outputs, of the WDM light signals input from said optical input port, the remaining light signals at wavelengths which do not pass through said transmittable-wavelength-variable filtering means; and
    control means which controls the central wavelength of said transmittable-wavelength-variable filtering means in such a manner that the level of the light signal passing through said transmittable-wavelength-variable filtering means is the maximum,
    wherein said transmittable wavelength bandwidth which passes through said transmittable-wavelength-variable filtering means is narrower than channel spacing of the WDM signals.

3. An optical receiver as set forth in claim 2, wherein said transmittable-wavelength-variable filtering means has a reflective member for reflecting the remaining light signals at wavelengths which do not pass through said transmittable-wavelength-variable filtering means to said optical output port.

4. An optical receiver as set forth in claim 1, wherein said transmittable-wavelength-variable filtering means has a reflective member for reflecting the remaining light signals at wavelengths which do not pass through said transmittable-wavelength-variable filtering means to said optical output port.

5. An optical transmission apparatus, comprising N optical receivers, N being an integer number greater than 2, each of the receivers includes:
    an optical input port which receives incoming wavelength-division multiplexed (WDM) light signals;
    transmittable-wavelength-variable filtering means which allows or permits, a light signal in a predetermined transmittable wavelength bandwidth to pass therethrough, out of the WDM light signals input from said optical input port, the light signal to be selectively received by the respective optical receiver, wherein a central wavelength of said transmittable wavelength bandwidth being a desired wavelength;
    an optical output port which outputs the remaining light signals out of the WDM light signals from said optical input port, at wavelengths which do not pass through said transmittable-wavelength-variable filtering means; and
    control means which controls the central wavelength of said transmittable-wavelength-variable filtering means in such a manner that the level of the light signal passing through said transmittable-wavelength-variable filtering means is the maximum,
    the optical output port of the ith (i=1 to N−1) of said optical receivers being connected to the optical input port of the (i+1)th of said optical receivers.

6. An optical transmission apparatus, comprising N optical receivers, N being an integer number greater than 2, each of which receivers includes: an optical input port which receives incoming wavelength-division multiplexed (WDM) light signals;
    transmittable-wavelength-variable filtering means which allows or permits, of the WDM light signals input from said optical input port, a light signal in a predetermined transmittable wavelength bandwidth to pass therethrough, a central wavelength of said transmittable wavelength bandwidth being a desired wavelength;
    an optical output port which outputs, of the WDM light signals from said optical input port, the remaining light signals at wavelengths which do not pass through said transmittable-wavelength-variable filtering means; and
    control means which controls the central wavelength of said transmittable-wavelength-variable filtering means in such a manner that the level of the light signal passing through said transmittable-wavelength-variable filtering means is the maximum,
    the optical output port of the ith (i=1 to N−1) of said optical receivers being connected to the optical input port of the (i+1)th of said optical receivers,
    wherein said transmittable wavelength bandwidth which passes through said transmittable-wavelength-variable filtering means is narrower than channel spacing of the WDM signals.

7. An optical receiver as set forth in claim 6, wherein said transmittable-wavelength-variable filtering means has a reflective member for reflecting the remaining light signals at wavelengths which do not pass through said transmittable-wavelength-variable-filtering means to said optical output port.

8. An optical receiver as set forth in claim 5, wherein said transmittable-wavelength-variable filtering means has a reflective member for reflecting the remaining light signals at wavelengths which do not pass through said transmittable-wavelength-variable filtering means to said optical output port.

9. An optical transmission apparatus as set forth in claim 6, wherein an optical amplifier for amplifying the incoming WDM signals is connected to the first of said optical receivers.

10. An optical transmission apparatus as set forth in claim 9, wherein at least one optical amplifier is interposed between two or more of said optical receivers.

11. An optical transmission apparatus as set forth in claim 5, wherein at least one optical amplifier is interposed between two or more of said optical receivers.

12. An optical receiver for receiving a light signal at an individual wavelength, which is obtained by optically amplifying incoming wavelength-division multiplexed (WDM) signals and then demultiplexing the WDM signals into individual wavelengths, said optical receiver comprising:

transmittable-wavelength-variable filtering means which allows or permits a light signal in a given transmittable wavelength bandwidth to pass therethrough, said given transmittable wavelength bandwidth being narrower than channel spacing of the WDM signals; and control means which controls a central wavelength of said transmittable-wavelength-variable filtering means in such a manner that the level of the light signal passing through said transmittable-wavelength-variable filtering means is the maximum.

13. An optical transmission apparatus, comprising:

an optical amplifier for amplifying wavelength-division multiplexed (WDM) signals;

an optical demultiplexer for demultiplexing the WDM signals received from said optical amplifer into light signals at separate wavelengths; and an optical receiver for receiving an individual one of the separate wavelengths, said optical receiver including:

transmittable-wavelength-variable filtering means which allows or permits a light signal in a given transmittable wavelength bandwidth to pass therethrough, said given transmittable wavelength bandwidth being narrower than channel spacing of the WDM signals; and control means which controls a central wavelength of said transmittable-wavelength-variable filtering means in such a manner that the level of the light signal passing through said transmittable-wavelength-variable filtering means is the maximum.

* * * * *

UNITED STATES PATENT AND TRADEMARK OFFICE
CERTIFICATE OF CORRECTION

PATENT NO.     : 6,970,613 B2
DATED          : November 29, 2005
INVENTOR(S)    : Hiroyuki Furukawa et al.

It is certified that error appears in the above-identified patent and that said Letters Patent is hereby corrected as shown below:

Column 13,
Line 46, after "signals" delete ":" and insert -- ; --.

Column 15,
Line 3, after "variable" delete "-".

Column 16,
Line 10, delete "amplifer" and insert -- amplifier --.

Signed and Sealed this

Sixteenth Day of May, 2006

JON W. DUDAS
*Director of the United States Patent and Trademark Office*